United States Patent [19]

Kuroda

[11] Patent Number: 5,140,433
[45] Date of Patent: Aug. 18, 1992

[54] NOISE REDUCTION CIRCUIT FOR REDUCING VIDEO SIGNAL NOISE BY MIXING CURRENT AND PREVIOUS VIDEO SIGNAL

[75] Inventor: Kazuo Kuroda, Tokorozawa, Japan

[73] Assignee: Pioneer Electric Corporation, Tokyo, Japan

[21] Appl. No.: 535,673

[22] Filed: Jun. 11, 1990

[30] Foreign Application Priority Data

Aug. 30, 1989 [JP] Japan ................ 1-223905

[51] Int. Cl.⁵ .................. H04N 5/21; G11B 7/00
[52] U.S. Cl. ............................ 358/312; 358/320; 358/337; 358/339; 358/907; 360/32; 360/36.2
[58] Field of Search ............. 358/310, 312, 320, 321, 358/322, 323, 324, 325, 326, 314, 339, 337, 342, 907; 360/10.1, 10.2, 10.3, 36.1, 36.2, 38.1

[56] References Cited

U.S. PATENT DOCUMENTS 4,477,838 10/1984 Akiyama ................ 358/322
4,835,623 5/1989 Okano et al. ........... 358/339
4,853,914 8/1989 Okano et al. .......... 358/322
4,862,099 8/1989 Nakai et al. ........... 358/327

*Primary Examiner*—Roy N. Envall, Jr.
*Assistant Examiner*—Huy Nguyen
*Attorney, Agent, or Firm*—Sughrue, Mion, Zinn, Macpeak & Seas

[57] ABSTRACT

A noise reduction circuit in a recording medium player is disclosed in which the time-axis of a video signal read out from a memory to be used for noise reduction is changed by a shift command signal for changing the time-axis of a video signal in order to keep the continuity of the phase of a color burst in special playback operation. Owing to the arrangement, even in a special playback operation, the phases of a chrominance signal and a luminance signal contained in a read out video signal, and those of a chrominance signal and a luminance signal contained in a video signal as a signal to be mixing-processed coincide with each other, which makes it possible to prevent the blur in a played back picture.

2 Claims, 8 Drawing Sheets

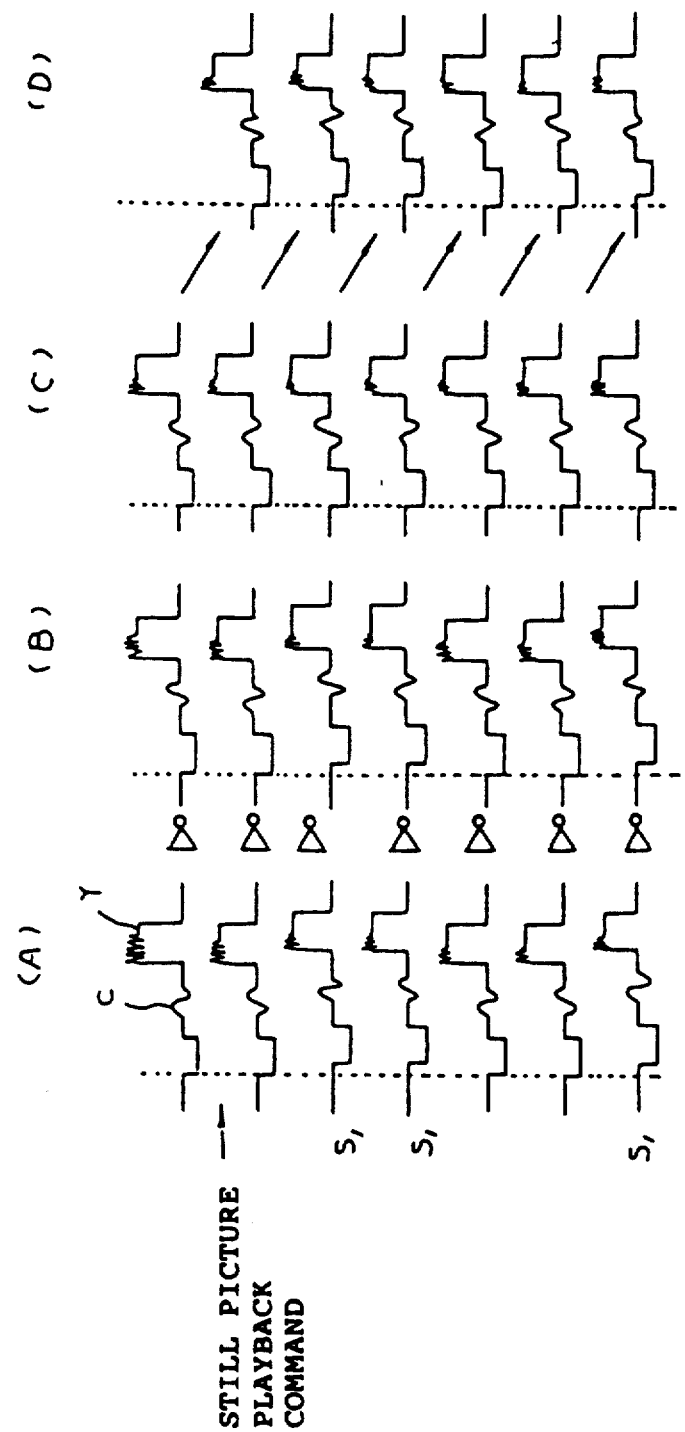

NOISE REDUCTION CIRCUIT FOR REDUCING VIDEO SIGNAL NOISE BY MIXING CURRENT AND PREVIOUS VIDEO SIGNAL

BACKGROUND OF THE INVENTION

1. Field of the Invention

The present invention relates to a noise reduction circuit, particularly to a noise reduction circuit in a recording medium player such as a video disk player etc.

2. Description of the Related Art

In a video signal auto-correlativity between frames is strong, but generally there is almost no auto-correlativity between noise components included in a video signal; there is a well known noise reduction circuit taking advantage of the above-mentioned phenomenon in which only the energy of noise components is lowered almost without changing the energy of a signal component by temporally averaging a video signal by every frame period.

A conventional noise reduction circuit is so constituted as shown in the following: a mixing means for mixing an input video signal and a signal to be mixing-processed at a mixing ratio corresponding to a coefficient k is provided; the output of the mixing means is delayed by one frame period with a frame memory etc., and supplied to the mixing means as the above-mentioned signal to be mixing-processed; the video signal output from the mixing means is the output signal of the noise reduction circuit.

An essential problem of a conventional noise reduction circuit is that it is effective for a still picture but for a moving picture it has a demerit of causing an afterimage etc. There is a circuit which is devised for preventing the above-mentioned defect, in which a moving picture part is detected and the coefficient k for the part is varied.

In a recording medium player such as a video disk player, when a still picture is played back, a video signal of the same frame is repeatedly read from a recording medium. In the NTSC system, however, the phase of a chrominance signal is chaned by 180 degrees every frame, so that in a recording medium player during the playback operation of a still picture, the time-axis of a video signal is shifted by an multiple of a quarter of a period of a color subcarrier for keeping the continuity of the phase of the chrominance signal in the video signal. Therefore if the noise reduction of a video signal obtained from a recording medium player is performed with a conventional noise reduction circuit, a phase difference is caused between the phase of the luminance signal in the input video signal and that of the luminance signal in the video signal read out from a memory as a signal to be mixing-processed by the shift of the time-axis performed for keeping the continuity of the phase of the chrominance signal. Since the luminance signals are averaged containing the phase difference as it is, there has been a problem that a played back picture is blurred.

SUMMARY OF THE INVENTION

Taking the above-mentioned problem into consideration, an object of the present invention is to provide a noise reduction circuit for a recording medium player in which the blur in a played back picture in a playback operation of a still picture can be prevented.

A recording medium player according to the present invention comprises read means for reading a signal recorded in a recording medium; play control means for performing a special playback operation including a track jump operation of an information read point of the read means; first time-axis shift means for changing the time-axis of a video signal read by the read means corresponding to a shift command signal by the time which is N times (N is a natural number) of a quarter of a period of a color subcarrier; and command generation means for issuing a shift command signal when the phase of a color burst in the output from the read means becomes discontinuous caused by a track jump of an information read point. The, noise reduction circuit in a recorded medium player including the following: mixing means for mixing a video signal read from a recording medium with the read means and a signal to be mixing-processed at a mixing ratio corresponding to an instantaneous level difference between the video signal and the signal to be mixing-processed; a memory; memory control means for writing the output of the mixing means and a shift command signal into the memory and for reading out a stored signal in order at a timing delayed by the time which is almost equal to M times (M is a natural number) of one field period, to output the signal as a signal to be mixing-processed; and second time-axis shift means for changing the time-axis of the signal to be mixing-processed read out from the memory by the time corresponding to N quarters of the color subcarrier frequency's period when either one exists, a shift command signal read out from the memory or a shift command signal issued from the command generation means.

Another recorded medium player according to the present invention comprises read means for reading a signal recorded on a recording medium; play control means for performing a playback operation of a still picture by making a one track jump of an information read point of the read means; first time-axis shift means for changing the time-axis of a video signal rad by the read means corresponding to a shift command signal by the time which is N times (N is a natural number) of a quarter of a period of the color subcarrier; and command generation means for issuing a shift command signal when the phase of the color burst in the output from the read means is made discontinuous by a track jump of an information read point. The noise reduction circuit in a recorded medium player is included the following: mixing means for mixing a video signal read from the recorded medium with the read means and a signal to be mixing-processed at a mixing ratio corresponding to an instantaneous level difference between the video signal and the signal to be mixing-processed; a memory; memory control means for writing the output of the mixing means and also for reading a stored signal in order with a timing delayed by the time, approximately equal to M times of one field period, to output as a signal to be mixing-processed; and second time-axis shift means for changing the time-axes of a signal to be written into a memory and a signal to be read from the memory by the time which is N times of a quarter of a period of the color subcarrier.

In a noise reduction circuit constituted as described in the above, even in a special playback operation, including a track jump operation which is performed every time when a frame of a video signal is read, the phases of the chrominance signals and the luminance signals included in the read out video signal and in the video signal as the signal to be mixing-processed to be supplied to the mixing means coincide respectively with each other.

BRIEF DESCRIPTION OF THE DRAWINGS

FIGS. 9(A)–9(D) are waveform representations of the operation of individual parts of the device shown in FIG. 7.

DETAILED DESCRIPTION OF PREFERRED EMBODIMENTS

Figure 1:
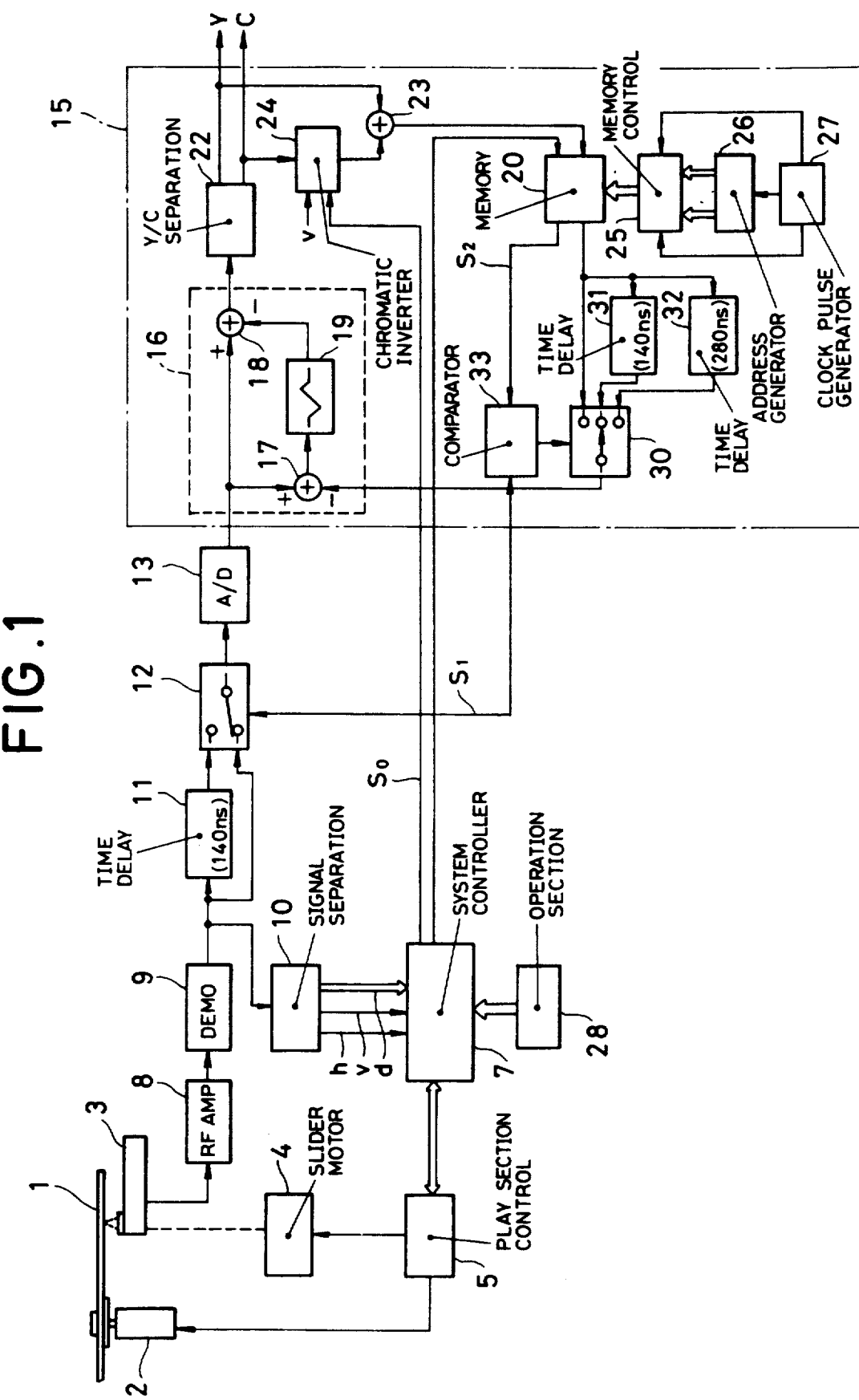
FIG. 1 is a block diagram showing an embodiment according to the present invention.

In FIG. 1, a disk 1 is driven by a spindle motor 2; a signal recorded on the disk 1 is read by a pickup 3 with the rotation of the disk 1; the pickup 3 is held by a slider (not shown in the drawing) which is moved in the radial direction of the disk 1 by a slider motor 4, and an information detection point (a light spot for reading information) of the pickup 3 can be freely positioned in the radial direction of the disk 1. Various kinds of servo systems such as a spindle servo system, a focus servo system, a tracking servo system and a slider servo system are provided but as they are well known systems they are not shown in the drawings.

The spindle moter 2 and a slider motor 4 are driven by the spindle servo system, the slider servo system or a play section control circuit 5. The play section control circuit 5 is so constituted that it drives the spindle motor 2 and the slider motor 4 corresponding to a command from the system controller 7, and executes the on-off control of the servo systems which are not shown in the drawings.

A so called RF signal output from the pickup 3 is supplied to a demodulation circuit 9 comprising an FM demodulator etc. through a RF amplifier 8 and a video signal is obtained by demodulation. The demodulated video signal is supplied to a signal separation circuit 10 and at the same time supplied to a delay circuit 11 to be delayed by 140 ns. A video signal delayed by the delay circuit 11 is supplied to an input terminal on a side of a changeover switch 12. A video signal output from the demodulation circuit 9 is directly supplied to an input terminal on the other side of the changeover switch 12. A changeover command signal is supplied to a control input terminal of the changeover switch 12 from the system controller 7. The changeover switch 12 is so constituted that when a changeover command signal does not exist, it selectively outputs a video signal output from the demodulation circuit 9, and when a changeover command signal exists, it selectively outputs a video signal output from the delay circuit 11. A time-axis shift means for changing the time-axis of a video signal is constituted with the delay circuit 11 and the changeover switch 12.

The video signal output from the changeover switch 12 is supplied to an A/D (analog/digital) converter circuit 13 to be converted to a digital signal. A video signal digitized by the A/D converter circuit 13 is supplied to a mixer circuit 16 in a noise reduction circuit 15.

Figure 2:
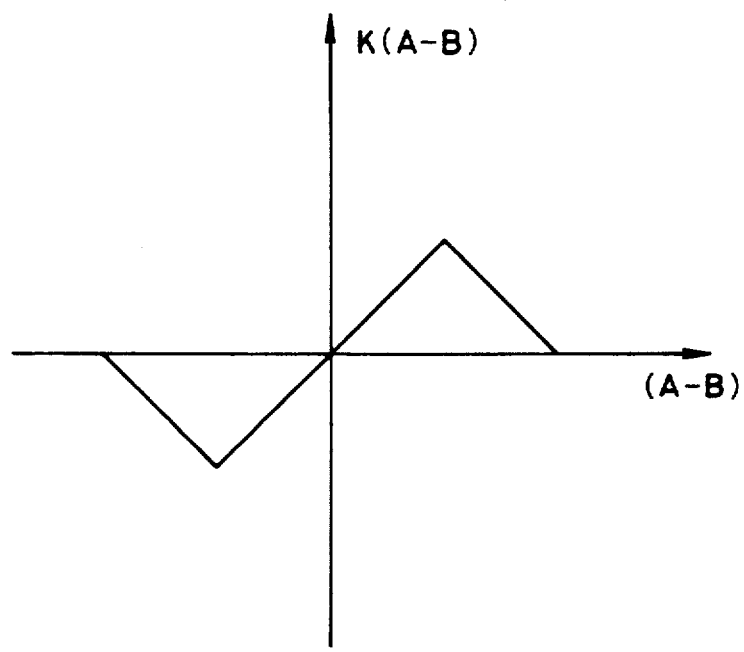
FIG. 2 is a graph showing a characteristic of a nonlinear circuit 19.

In the mixer circuit 16, a output signal of the A/D converter 13 is supplied to subtracter circuits 17 and 18. A video signal read from a memory 20 is supplied to the subtracter circuit 17 through a time-axis shift means comprising a changeover switch 30 and delay circuits 31 and 32. The video signal read from the memory 20 is, as described later, a signal similar to the signal obtained by delaying a video signal output from the mixer circuit 16 by a time approximately corresponding to the period of one field. In the subtracter circuit 17, the output of the memory 20 is subtraced from the output of the A/D converter circuit 13. The output signal of the subtracter circuit 17 is supplied to a nonlinear circuit 19. The nonlinear circuit 19 comprises a ROM in which, for example, the output signal of the subtracter circuit 17 is supplied to an address input terminal and the data k (A − B) corresponding to the input/output characteristics as shown in FIG. 2 are stored beforehand in individual addresses designated by the output (A − B) of the subtracter circuit 17.

The output data of the nonlinear circuit 19 are supplied to the subtracter circuit 18. In the subtracter circuit 18, the output data of the nonlinear circuit 19 is subtracted from the output data of the A/D converter 13. In the mixer circuit 16, which is constituted with these subtracter circuits 17 and 18, and the nonlinear circuit 19, a signal is formed by mixing the video signal output from the A/D converter circuit 13 and the video signal read out from the memory 20 at a mixing ratio corresponding to the difference (movement) between the instantaneous values of both signals to be output from the subtracter circuit 18. In other words, when the movement is large, a video signal A output from the A/D converter 13 is made dominant, and when the movement is small a video signal B, a previous signal by one field period read from the memory 20, is mixed to the video signal A to make noise inconspicuous.

The output of the subtracter circuit 18 is supplied to a Y/C separation circuit 22 to be separated into a luminance signal Y and a chrominance signal C. The luminance signal Y is supplied to an adder circuit 23; the chrominance signal C is supplied to the adder circuit 23 after the phase is inverted by the chromatic inverter 24 and it is added to the luminance signal Y for synthesis.

The video signal output from the adder circuit 23 is supplied to the memory 20 together with a shift-command signal S1 output from the system controller 7. The memory 20 has a storage capacity for storing at least one field of a video signal. The memory control such as an address control of the memory 20 is executed by a memory control circuit 25. The write address data and the read address data output from an address generator circuit 26 are aupplied to the memory control circuit 25.

The address-count clock pulses output from a clock pulse generator circuit 27 are supplied to an address generator circuit 26. The address generator circuit 26 is so constituted that it has a counter which counts up the address-count clock pulses and outputs the output data of the counter as write address data, and at the same time it creates and outputs read address data which differ from the write address data by the value corresponding to a time which is 140 ns shorter than one field period. The clock pulse generater circuit 27 is so constituted as to generate write clock pulses and read clock pulses which have the same frequency as the address-count clock pulses; the write clock pulses and the read clock pulses output from the clock pulse generator circuit 27 are supplied to the memory control circuit 25.

The memory control cirucit 25 is so constituted as to execute the controls that: the video signal from the adder circuit 23 and a shift-command signal S1 from the system controller 7 are written in order in the memory 20 with write clock pulses to the addresesss designated by write address data, and a signal written in the addresses desigated by read address data in the memory 20 is read out in order with read clock pulses. The memory 20 delays the video signal from the adder circuit 23 and the shift command signal S1 from the system, controller 7 a time interval 140 ns shorter than one field period.

The video signal read out from the memory 20 becomes one of the three inputs of a changeover switch 30, and is also supplied to delay circuits 31 and 32. The delay circuit 31 delays the input signal by 140 ns, and the delay circuit 32 delays the input signal by 280 ns. The outputs of these delay circuits become two inputs out of the three inputs of the changeover switch 30.

The changeover control data is output from a comparator circuit 33 and supplied to the control input terminal of the changeover switch 30. The comparator circuit 33 determines which one of the two signals, the shift-command signal S1 output from the system controller 7 or a shift-command signal S2 read out from the memory 20, is to be output as a changeover control data. The changeover switch 30 operates as follows: when it detects that only the shift-command signal S1 is output by the changeover control data, the output of the delay circuit 32 is selectively output; when it detects that only the shiftcommand signal S2 is output, the video signal read out from the memory 20 is selectively output; and when it detects that both S1 and S2 are output or both are not output, the output of the delay circuit 31 is selectively output. The output of the changeover switch 30 is supplied to the mixer circuit 16 as a signal to be mixing-processed.

On the other hand, in the signal separation circuit 10, horizontal and vertical synchronizing signals h and v, and control data d such as a Phillips code are separated and extracted from the video signal output from the demodulator circuit 9, and they are supplied to the system controller 7. The system controller 7 is constituted with a micro computer comprising, for example, a processor, a ROM, a RAM, etc., and is made to perform a computing operation based on the data or a program stored in the RAM, ROM etc. by a command supplied from the control section 28 corresponding to a key operation, and after that sends out command signals such as a play, a jump, etc. to the control circuit 5 of the play section.

Figure 3:
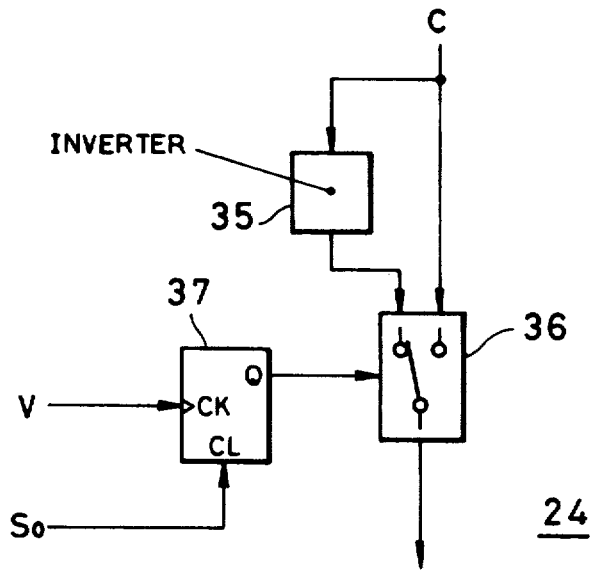
FIG. 3 is a circuit block diagram showing a concrete constitution of a chromatic inverter 24.

FIG. 3 is a block diagram showing a specific embodiment of the chromatic inverter 24: a chrominance signal C output from the Y/C separation circuit 22 is inverted with an inverter circuit 35 and then supplied to an input terminal on a side of the changeover switch 36. A chrominance signal C is directly supplied to the other side input terminal of the changeover switch 36. A output terminal Q of a T type flip-flop circuit 37 is connected to a control input terminal of the changeover switch 36. A vertical synchronizing signal v from the signal separation circuit 10 is supplied to a clock pulse input terminal CK of the T type flip-flop circuit 37. A constantly workable inversion command signal S0 from the system controller 7 is supplied to a clear input terminal CL of the T type flip-flop circuit 37.

The changeover switch 36 is so constituted that when a low level signal is supplied to the control input terminal, the chrominance signal C from the Y/C separation circuit 22 is selectively output; when a high level signal is supplied to the control input terminal, a chrominance signal inverted with the inverter circuit 35 is selectively output. The output of the changeover switch 36 is supplied to the adder circuit 23 as the output of the chromatic inverter 24.

The operation of a processor in the system controller 7 in the constitution as described in the above will be explained referring to the flow chart shown in FIG. 4.

When play operation is being performed by the execution of a main routine etc., if a still picture playback command is issued from the operation section 28, the processor shifts over to step S1 and makes the contents at a specified address of a RAM zero to be used as count values m and n. After the execution of the step S1, the processor makes repeatedly judges whether the vertical synchronizing signal v is output or not (step S2), and only when it judges that the vertical synchronizing signal v is output, it sends out a constantly workable inversion command signal S0. Simultaneously it sends out a-command for a one track jump going upstream in a read direction to the control circuit 5 of the play section (step S3 and S4).

After the execution of step S4, the processor sends out a shift command signal S1 (step S5). Next, the processor repeatedly judges whether the vertical synchronizing signal is output or not (step S6), and only when it judges that the vertical synchronizing signal is output is 1 added to a count value n (step S7). Next, it judges if the count value n is equal to 2 (step S8). In the step S8, if the count value is judged not to be equal to 2, the processor shifts over to step S6 again. In step S8, if the count value is judged to be equal to 2, the processor sends out a command to make a 1 track jump going upstream in a read direction to the control circuit 5 in the play section (step S9), and makes the count value n zero (step S10).

After the excution of step S10, the processor adds 1 to the count value m (step S11), and judges whether the count value m is equal to 2 or not (step S12). In step S12, if it is judged that the count value m is equal to 2, the processor makes the count value m zero (step S13), and shifts over to step S5. In step S12 when it is judged that the count value m is not equal to 2 the processor stops sending out a shift command signal S1 (step S14), and judges whether a release command of a still picture playback operation is issued or not from the control section 25 (step S15). In step 15, when it is judged that the release command of a still picture playback operation is not issued, the processor shifts over to step S6 again. In step S15, when it is judged that the release command of a still picture playback operation is issued, the processor stops sending out a constantly workable inversion command signal S0 (step S16), and resumes the execution of a routine which it had been executing right before shifting over to step S1.

Figure 5:
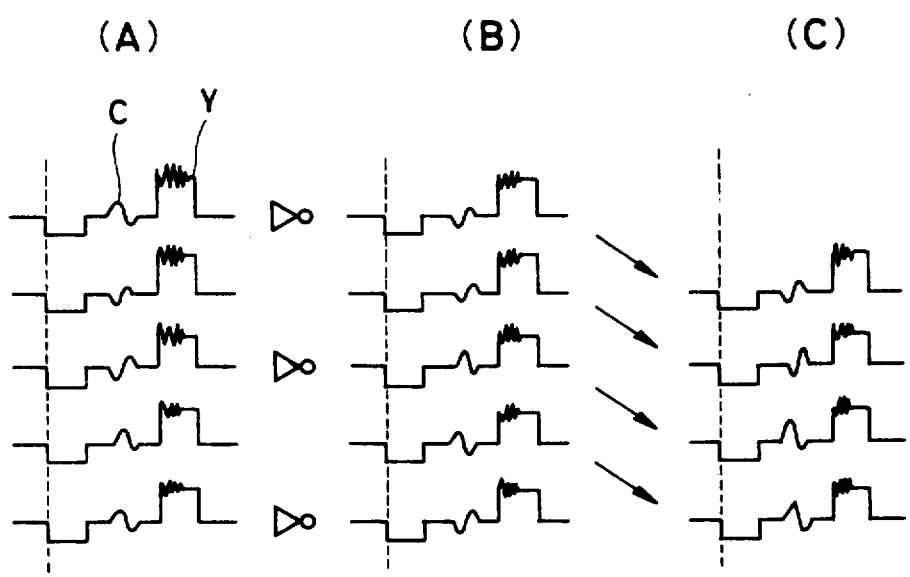
FIGS. 5(A)–(C) and 6(A)–D are waveform representations showing the operation of individual parts of a device shown in FIG. 1.

As described in the above, in an ordinary play operation a shift command signal S1 is not output from the system controller 7, and as shown in FIG. 5(A) after a video signal is read from the disk 1 it is digitized by the A/D converter circuit 13 and then the video signal is supplied in order to the noise reduction circuit 15. In FIG. 5(A) to FIG. 5(C), the waveforms of a video signal in a horizontal synchronizing period which are successively selected accurately in every other field period are shown. These respective waveforms are illustrated so that the time points, which are different from each other by the time which is a multiple of the period of one field, can be in the similar position in the lateral direction. An inverter between FIG. 5(A) and FIG. 5(B) shows that the phase of a chrominance signal is inverted with the chromatic inverter 24. A symbol C expresses a color burst and Y expresses a luminance signal.

In an ordinary play operation, a constantly workable inversion command signal S0 is not output from the system controller 7 and a T type flip-flop circuit 37 in the chromatic inverter 24 is placed in a set condition for every other field period by a vertical synchronizing signal. A chrominance signal and a phase inverted chrominance signal are alternately output during every other field from the changeover switch 36 in the chromatic inverter 24. The output of the changeover switch 36 is added and composed with a luminance signal and supplied to the memory 20, so that a signal to be written into the memory 20 becomes a signal as shown in FIG. 5(B). A signal to be written into the memory 20 is read out after a time which is 140 ns shorter than one field period, so that a signal read out from the memory 20 and delayed by 140 ns with a delay circuit 31 becomes equivalent to a signal which is obtained by delaying a signal written in the memory 20 by one field period. Therefore, the output of the delay circuit 31 becomes the signal as shown in FIG. 5(C) and the phases of the chrominance signal and the luminance signal coincide with those of the chrominance signal and the luminance signal in a video signal from the A/D converter circuit 13 shown in FIG. 5(A). In this case, both shift command signals S1 and S2 are not output, so that the output from the delay circuit 31 is selectively output from the changeover switch 30 controlled by the changeover control data from the comparator 33 and supplied to the mixer circuit 16, thereby noise reduction is effectively performed.

Figure 4:
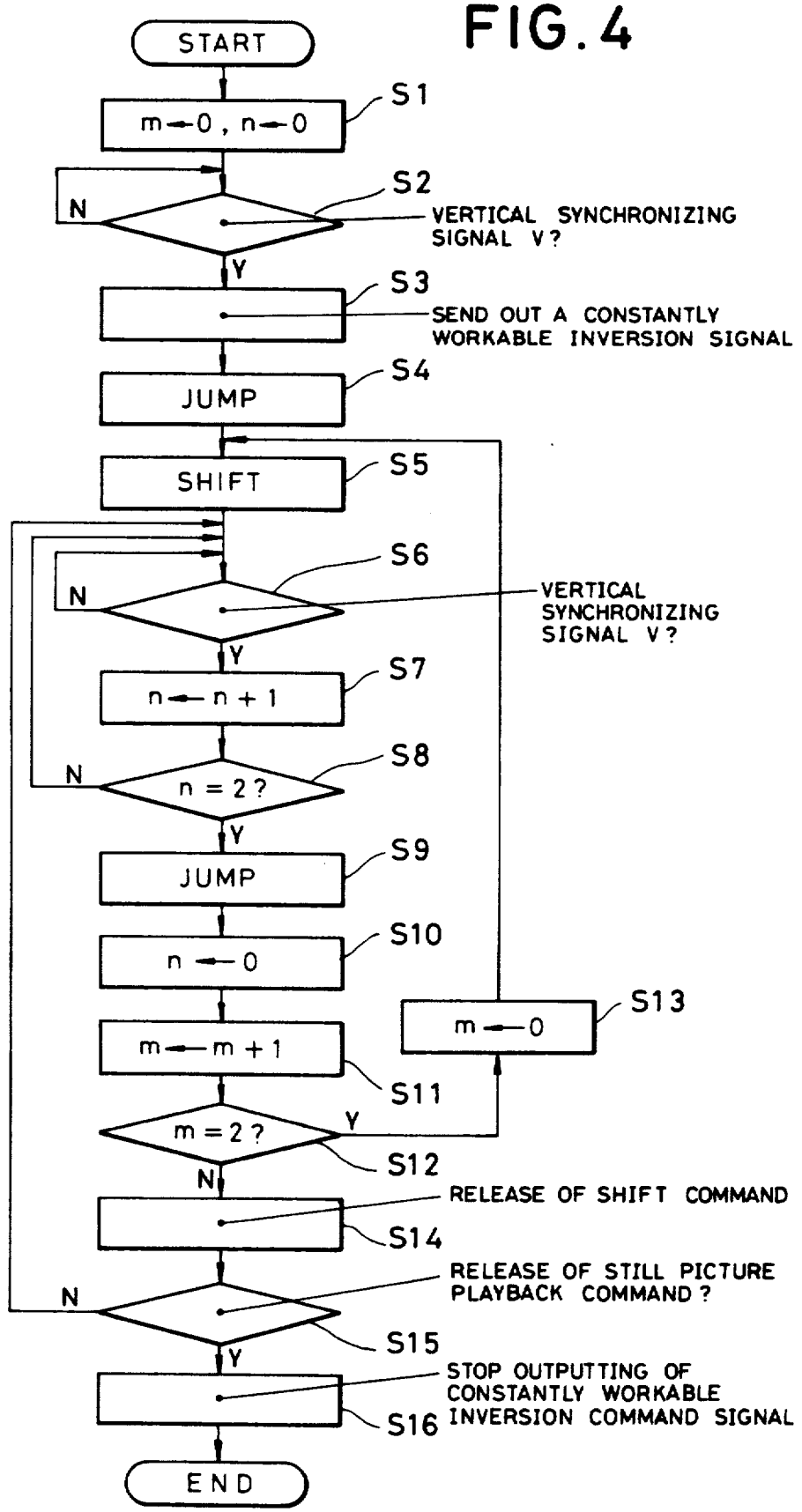
FIG. 4 is a flow chart showing the operation of a processor in a system controller 7.

Next, when a still picture playback command is issued, in each time when one frame of a video signal is read which is recorded in steps S4 to S15 as shown in the flow chart in FIG. 4, one track jump going upstream in the read direction is performed to read the same frame repeatedly for executing a still picture playback operation. Preceding the still picture playback operation, in step S3 the constantly workable inversion command signal S0 is output, so that the T type flip-flop circuit in the chromatic inverter 24 is reset and a low level signal is supplied to a control input terminal of the changeover switch 36. In the, result, a phase-inverted chrominance signal is selectively output from the changeover switch 36. During the still picture playback operation, the shift command signal S1 is output in each time when one frame of a video signal is read in steps S11 to S13.

Figure 6:
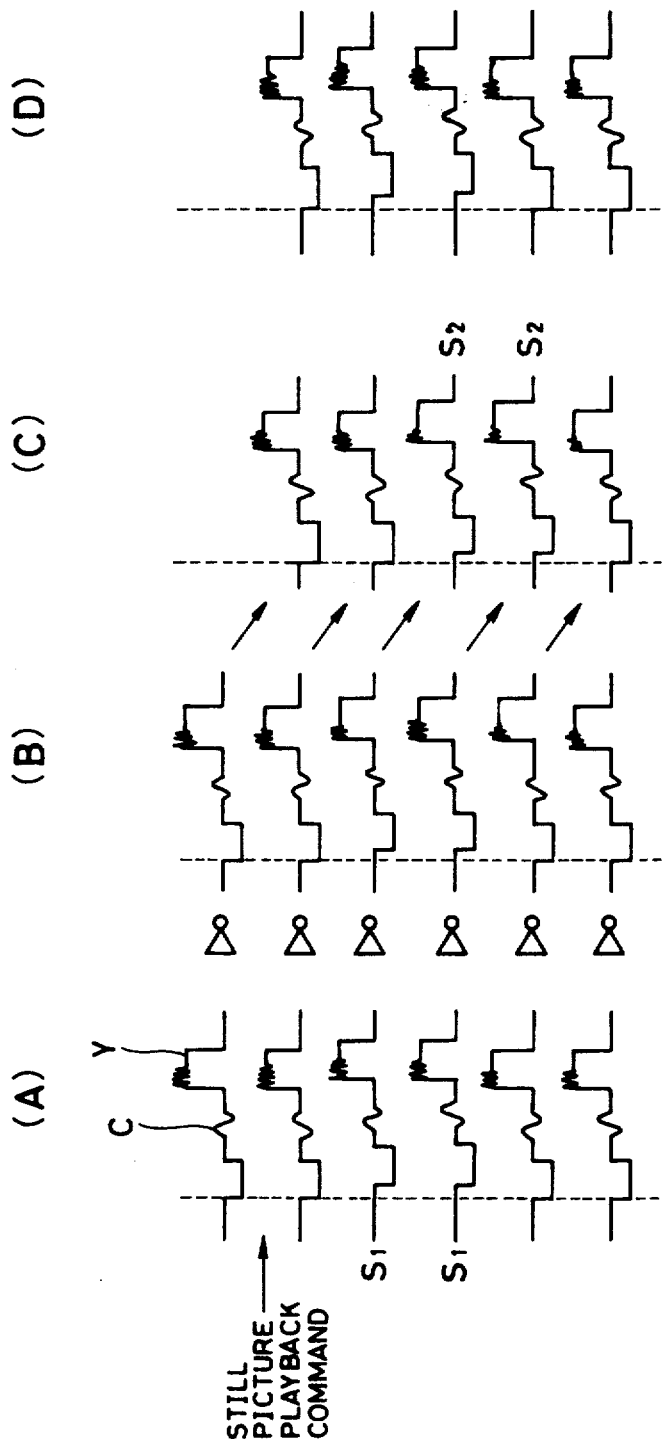

Therefore, as shown in FIG. 6(A), during a still picture playback operation, the time-axis of a video signal read from the disk 1 and supplied to the noise reduction circuit 15 is changed by 140 ns in every other frame. When the phases of 2 subcarriers which constitute a playback frame picture are equal, the constantly workable inversion command signal S0 is output from the system controller 7 during a still picture playback operation, and the T type flip-flop circuit 37 in the chromatic inverter 24 is always made to be in a reset condition. A phase-inverted chrominance signal is also selectively output from the changeover switch 36 in the chromatic inverter 24. The output of the changeover switch 36 is added and composed with a luminance signal, and supplied to the memory 20, and so the video signal written in the memory 20 becomes as shown in FIG. 6(B). A shift command signal S1 is supplied to the memory 20 and the shift command signal S1 is written in shift information area of the memory 20.

A signal written in the memory 20 is read out after a lapse of time which is 140 ns shorter than one field period, so that a signal delayed by 140 ns with the delay circuit 31 after it is read out from the memory 20 is equivalent to a signal obtained by delaying a signal written in the memory 20 by one field period. Therefore, the output of the delay circuit 31 becomes as shown in FIG. 6(C), and so there can be a field in which the phases of a chrominance signal and a luminance signal do not coincide with those of a chrominance signal and a luminance signal in a video signal from the A/D converter circuit 13.

Since only the shift command signal S1 exists when the phase of an output of the delay circuit 31 is advances by 140 ns comparing to that of a video signal from the A/D converter circuit 13, the output of the delay circuit 32 is selectively output from the changeover switch 30 by the changeover control data from the comparator 33 to be supplied to the mixer circuit 16. When the output of the delay circut 31 is delayed by 140 ns comparing to a video signal from the A/D converter ciucuit 13, only the shift command signal S2 exists, so that a video signal read out from the memory 20 is selectively output from the changeover switch 30 by the changeover control data from the comparator circuit 33 to be supplied to the mixer circuit 16. Therefore, the output of the changeover switch 30 becomes as shown in FIG. 6(D) and the phases of the chrominance signal and the luminance signal coincide with those of the chrominance signal and the luminance signal in a video signal from the A/D converter circuit 13 as shown in FIG. 6(A), which makes noise reduction be performed effectively.

Figure 7:
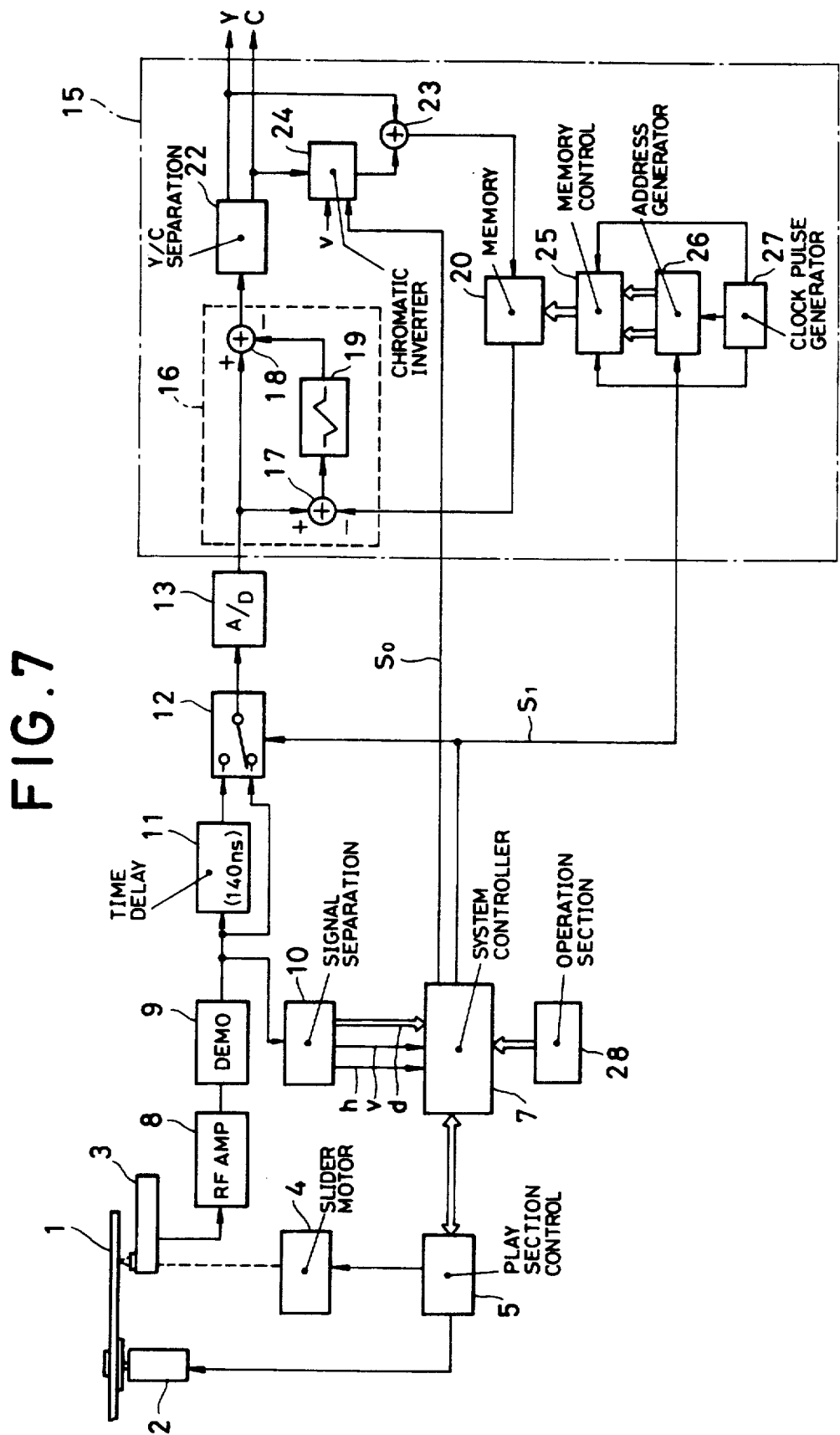
FIG. 7 is a block diagram showing another embodiment of the present invention.

FIG. 7 is a block diagram showing another embodiment of the present invention in which: a disk 1, a spindle motor 2, a pickup 3, a slider motor 4, a play section control ciucuit 5, a system contorller 7, an RF amplifier 8, a demodulator circuit 9, a signal separation circuit 10, a delay circuit 11, a changeover switch 12, an A/D converter circuit 13, a noise reduction circuit 15, and a control section 28 are connected in a similar way to the parts in the device shown in FIG. 1. In the noise reduction circuit in the present embodiment, however, the changeover switch 30, the delay circuits 31 and 32, and the comparator 33 are removed from the device shown in FIG. 1. Only the video signal output from the adder circuit 23 is supplied to the memory 20. The video signal read out from the memory 20 is directly supplied to the adder circuit 17. A shift command signal S1 output from the system controller 7 is supplied to the address generator circuit 26.

Figure 8:
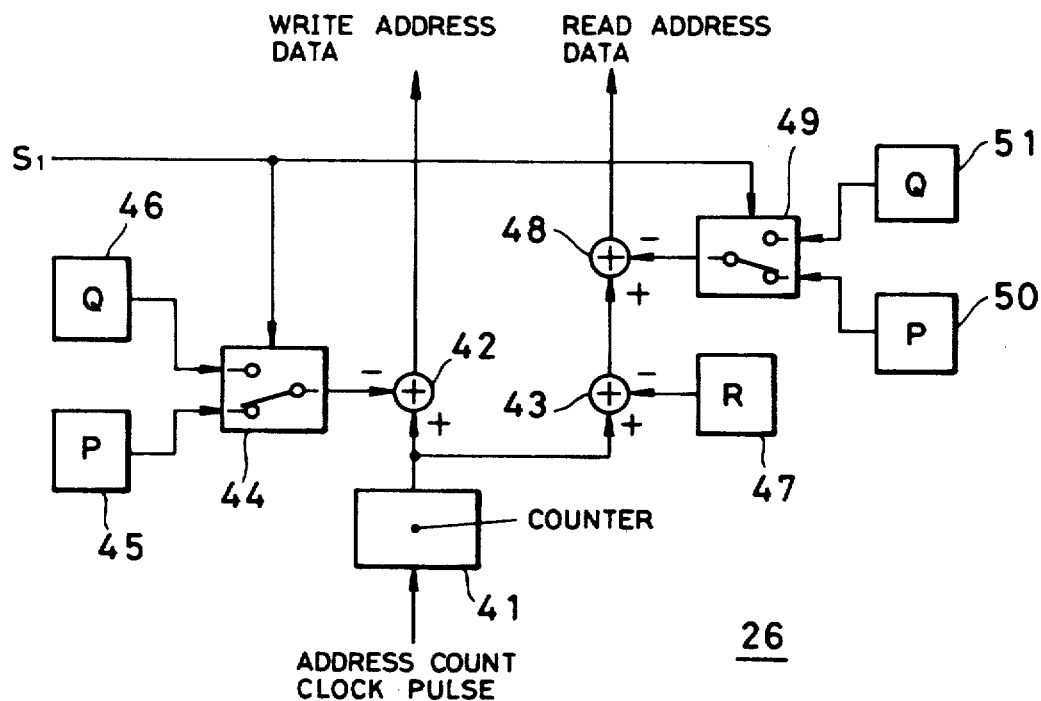
FIG. 8 is a circuit block diagram showing the concrete constitution of an address generator circuit 26.

FIG. 8 is a block diagram showing a specific embodiment of the address generator 26 in the present embodiment. In the figure, address counter clock pulses from the clock pulse generator circuit 27 are supplied to a clock pulse input terminal of a counter 41. The output data of the counter 41 are supplied to the subtracter circuits 42 and 43. In the subtracter circuit 42, the output data of a changeover switch 44 are subtracted from the output data of the counter 41. Data P and Q output respectively from data generator circuits 45 and 46 are supplied to the changeover switch 44. The data P is set to be larager than the data Q by the value of change of the count value of the counter 41 in 140 ns. A shift command signal S1 is supplied to the control input terminal of the changeover switch 44. The changeover switch 44 selectively outputs the data P when the shift command signal S1 does not exist, and selectively outputs the data Q when the shift command signal S1 exists.

The output data of the subtracter circuit 42 are supplied to a memory control circuit 25 as write address data.

On the other hand, in the subtracter circuit 43, output data R of a data generator circuit 47 is subtracted from the output data of the counter 41. The data R are the data corresponding to the change of the count value of the counter 41 in one field period. The difference corresponding to one field period is produced between the write address data and the read address data by these subtracter circuit 43 and the data generator circuit 47.

The output data of the subtracter circuit 43 are supplied to a subtracter circuit 48, and the output data of a changeover switch 49 is subtracted from the output data of the subtracter ciucuit 43. The data P and Q output respectively from data generator circuits 50 and 51 are supplied to the changeover switch 49. A shift command signal S1 is supplied to the control input terminal of the changeover switch 49. The changeover switch 49 is constituted to selectively output the data P when the shift command signal S1 does not exist, and to selectively output the dataa Q when the shift command signal S2 exists.

The output data of the subtracter circuit 48 are supplied to the memory control circuit 25 as read address data.

In the constitution as described in the above, in an ordinary play operation, a shift command signal S1 is not output from the system controller 7, and the phases of the chrominance signal and the luminance signal in a video signal read out from the memory 20 coincide with those of the chrominance signal and the luminace signal in a video signal to be supplied to the noise reduction circuit 15, which makes noise reduction be performed effectively.

In a still picture playback operation, a constantly workable inversion command signal S0 is output, and at each time when one frame of a video signal is read, a shift command signal S1 is output. In doing so, during a still picture playback operation, as shown in FIG. 9(A), the time-axis of a video signal read from the disk 1 and supplied to the noise reduction circuit 15 is shifted by 140 ns every other frame.

The T type flip-flop ciucuit 37 in the chromatic inverter 24 is made to be always in a reset condition by a constantly workable inversion command signal S0, and a phase-inverted chrominance signal is selectively output from the changeover switch 36 in the chromatic inverter 24. The output of the changeover switch 36 is added and synthesized with a luminance signal and supplied to the memory 20, and so the video signal to be supplied to the memory 20 becomes as shown in FIG. 9(B).

From the changeover switch 44 the data Q is selectively output being changed from the data P by a shift command signal S1. Therefore when the shift command signal S1 exists, the write address data becomes smaller by the value of change in a count value of the counter 41 in 140 ns comparing to the case where a shift command signal S1 does not exist. In the result, the time-axis of a video signal to be written in the memory 20 corresponding to a shift command signal S1 changed by 140 ns, and the video signal to be written in the memory 20 becomes as shown in FIG. 9(C).

The data Q are selectively output from the changeover switch 49 being changed from the data P by the shift command signal S1. Therefore when the shift command signal S1 exists, the read address data becomes smaller by the value of change in a count value of the counter 41 in 140 ns comparing the case where the shift command signal S1 does not exist. In the result, the time-axis of a video signal read out from the memory 20 corresponding to the shift command signal S1 is changed by 140 ns, and so the video signal read out from the memory 20 becomes as shown in FIG. 9(D).

As clearly seen from FIG. 9(A) and FIG. 9(D), the phases of a chrominance signal and a luminance signal contained in a signal from the A/D converter circuit 13 to be supplied to the mixer circuit 16 and those of a chrominance signal and a luminace signal,,containged in a video signal from the memory 20 coincide with each other, which effectively performs noise reduction.

In the device shown in FIG. 1, the time-axis of a video signal read out from the memory 20 corresponding to the output from the comparator circuit 33 is changed by the changeover switch 30, and the delay circuits 31 and 32, but it is also possible that the time-axis of a video signal read out from the memory 20 is changed by changing the read address data of the memory 20 corresponding to the output of the comparator 33.

In a device shown in FIG. 7, the time-axis of a signal to be written to the memory 2 and of a signal read out from the memory 20 are changed by changing the read address data and the write address data of the memory 20, but it can be considered that the time-axis of a signal to be written to the memory 20 and a signal to be read out from the memory 20 are change by changing a write timing and a read timing.

As described in detail in the above, in a noise reduction circuit in a recording medium player according to the present invention the following steps are performed: when the phase of a color burst in an output of a read means is made discontinuous by a track jump of an information point of the read means, a shift command signal is issued. The time-axis of a video signal read by the read means is changed by the time which is N times of a quarter of a period of the color subcarrier, corresponding to the shift command signal. A video signal read from a recording medium by the read means and a signal to be mixing-processed are mixed at a mixing ratio being proportional to the instantaneous level difference between the video signal and the video signal to be mixing-processed. The mixed output and the shift command signal are written to a memory, and at the same time the stored data are read out in order with a timing delayed by the time, almost equal to M times of one field period, and the read out data are output as the above-mentioned signal to be mixing-processed. When either one exists, a shift command signal read out from the memory or an issued shift command signal, the time-axis of the signal to be mixing-processed is changed by the time which is N times of a quarter of a period of the color subcarrier.

A noise reduction ciucuit in a further different recording medium player according to the present invention is operated as follows. When the phase of a color burst in the output of the read means is made discontinuous by a track jump of an information read point of the read means, a shift command signal is. The time-axis of a video signal read by the read means is changed by the time, N times of a quarter of a period of the color subcarrier, according to the shift command signal. A video signal read from a recording medium by the read means and a signal to be mixing-processed are mixed by a mixing means at a mixing ratio corresponding to the instantaneous level difference between the video signal and the signal to be mixing-processed. The mixed output is written to a memory and at the same time the data in the memory are read out in order at a timing being delayed by the time which is almost equal to M times of one field period, and the read out data are output as the signal to be mixing-processed. The time-axis of a signal to be written into the memory and a signal to be read from the memory corresponding to a shift command signal are changed by the time which is N times of a quarter of a period of the color subcarrier.

Therefore, in a noise reduction circuit in a recording medium player according to the present invention, even in a special playback operation such as a still picture playback operation in which one track jump is performed in each time when one field of a video signal is read, the phases of a chrominance signal and a luminance signal contained in a read video signal and the phases of a chrominance signal and a luminance signal contained in a video signal as a signal to be mixing-processed coincide with each other, which makes it possible to prevent the blur in a played back picture.

What is claimed is:

1. A recording medium player comprising:
   read means for reading a video signal recorded in a recording medium;
   play control means for controlling a special playback operation including a track jumping operation for moving an information reading point of said read means across at least one track of said recording medium;
   command issuing means for issuing a current shift command signal when said track jumping operation is performed;
   first time-axis shift means for changing a time-axis of said video signal by an amount equaling N quarters of a period of a color subcarrier based upon said current shift command signal; and
   a noise reduction circuit including:
   mixing means for mixing said video signal read from said recording medium by said read means and a signal to be mixing-processed, at a mixing ratio corresponding to an instantaneous level difference between said video signal and said signal to be mixing-processed;
   memory;
   memory control means for writing an output of said mixing means and a corresponding current shift command signal into said memory, and for reading data from said memory, said data representing a previous output of said mixing means and a corresponding previous shift command signal, said data being delayed in said memory by an amount of time almost equal to M times of one field period, said previous mixing means output representing said signal to be mixing-processed; and
   second time-axis shift means for changing the time-axis of the signal to be mixing-processed by N quarters of the color subcarrier period based on said current and previous shift command signals.

2. A recording medium player comprising:
   read means for reading a video signal recorded in a recording medium;
   play control means for performing a still picture playback operation by making an information reading point in said read means perform a one track jump;
   first time-axis shift means for changing a time-axis of said video signal by an amount equaling N quarters of a period of a color subcarrier;
   command generation means for issuing a shift command signal when said still picture playback operation is performed, and
   a noise reduction circuit including:
   mixing means for mixing said video signal and a signal to be mixing-processed at a mixing ratio corresponding to an instantaneous level difference between said video signal and said signal to be mixing-processed;
   memory;
   memory control means for writing an output of said mixing means in said memory, and for reading out data, representing a previous output of said mixing means and a corresponding previous shift command signal, said data being delayed in said memory by M times of one field period, said read out data representing said signal to be mixing-processed; and
   second time-axis shift means for changing a time-axis of said mixing means output before writing said mixing means output to said memory and a time-axis of said previous mixing means output read from said memory based on said shift command signal by N quarters of a period of said color subcarrier.

* * * * *